Nov. 1, 1955
W. D. MACGEORGE
2,722,198
COMBINED FLUID PRESSURE AND ELECTRICALLY
CONTROLLED SERVOMOTOR SYSTEM
Filed April 22, 1953
2 Sheets-Sheet 1
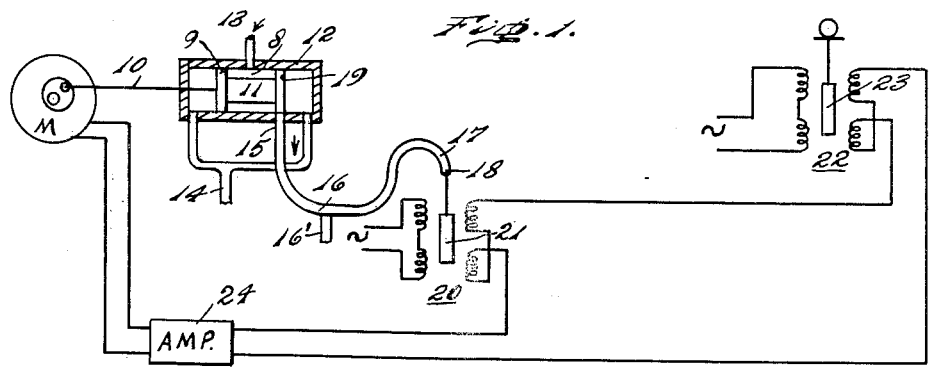
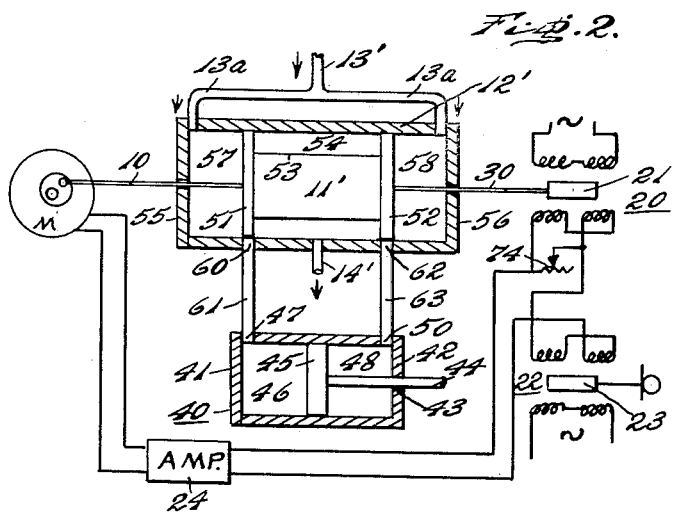
INVENTOR.
William D. Macgeorge
BY Frank H. Border
ATTORNEY

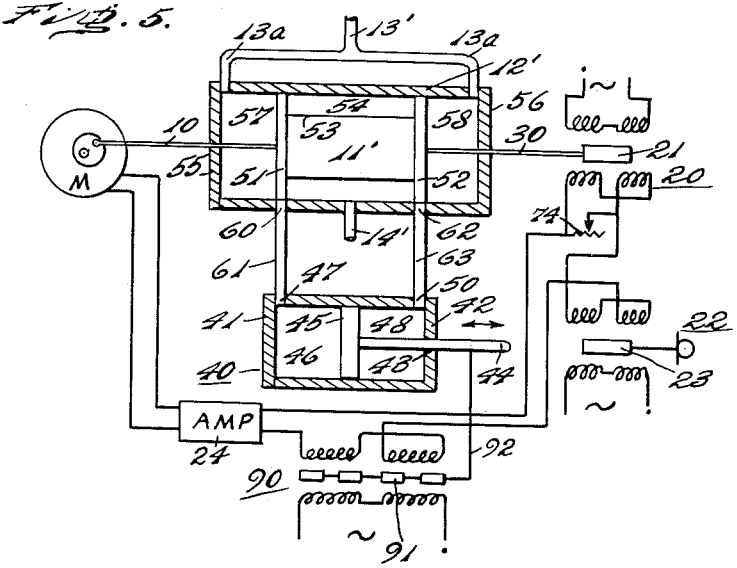

United States Patent Office

2,722,198
Patented Nov. 1, 1955

2,722,198

COMBINED FLUID PRESSURE AND ELECTRICALLY CONTROLLED SERVOMOTOR SYSTEM

William D. Macgeorge, Lansdale, Pa., assignor to Automatic Temperature Control Co., Inc., Philadelphia, Pa., a corporation of Pennsylvania Application April 22, 1953, Serial No. 350,484

9 Claims. (Cl. 121—41)

This invention relates to combined fluid pressure and electronic control systems, and more particularly to such combined elements in electro-pneumatic converters and proportional relays.

In many of applicant's prior patents and particularly in the patent to Hornfeck, No. 2,420,539, a null-balance system is disclosed in which a signal transmitter utilizes a differential or like movable element transformer, having its relatively movable armature responsive in positioning to variations in a condition, which establishes a signal output of given, or opposite, phase, and of amplitude proportional to the relative motion of the armature from a position at which the signal from the transformer is substantially null. A receiver, including a similar differential or movable element transformer is provided, the positioning of the relatively movable armature of which is a function of a servomotor movement, which motor moves in the proper sense in response to unbalance between the transmitter and receiver signal, and stops when balance in the transformer circuit is substantially achieved. The motor usually also actuates indicators or recorders. This type of null-balance circuit is highly efficient and accurate, as the preferred differential transformers are linear in their outputs.

It is among the objects of this invention to effect improvements in indicating and control systems; to combine the actuation of the armature of a differential transformer with a fluid pressure unit in an instrument; to provide a hydraulic or fluid pressure relay; to provide new and improved control circuits; to provide new and improved combined electric and fluid pressure control systems; to provide an improved proportioning relay; to combine a fluid pressure relay with a pneumatic electric converter; to convert a displacement into an equivalent controlled pressure; to provide a force relay by which a small displacement caused by a small force will cause a large displacement of a strong force; to provide a fluid relay in which a small displacement caused by negligible force controls a larger displacement of a larger force; to provide a fluid pressure force displacement by a negligible force to control a larger displacement with larger force with sensitivity control; and to provide other improvements and advantages as will become apparent as the description proceeds.

In the accompanying drawings forming part of this disclosure:

Fig. 1 represents diagrammatically an electro-fluid pressure control of the "floating type."

Fig. 2 represents diagrammatically a fluid pressure relay system in which the fluid flow is proportional to the controlling variable.

Fig. 3 represents diagrammatically an electro-fluid pressure control system of the proportional type.

Fig. 4 represents diagrammatically a fluid pressure control system like Fig. 2, in which the fluid flow is proportional to the controlling variable, and in which sensitivity of response is enhanced, and in which rebalance of the control system is functional with a movement of the fluid pressure-responsive element, in one form of rebalancing organization.

Fig. 5 represents a view similar to that of Fig. 4, in which rebalance of the control system is proportional to the movement of the fluid pressure-responsive element, in a modified form of rebalancing organization.

Referring to Figs. 1 and 3, a motor M is provided, positioning, by its running, a connecting rod 10, the free end of which is connected to a movable valve element 11 in a valve housing 12. The latter has an input of fluid pressure at 13, which may be for gas or liquid, and illustratively is air pressure. The housing has a dual outlet 14 for venting the pressure entering inlet 13, and an outlet port 15, connected to a conduit 16. Connected to the working port or outlet 15, as noted, in the valve housing, conduit 16 may be of any reasonable length, and communicates with a resilient pressure-responsive element 17, having a movable portion 18, responsive in setting to the instantaneous pressure in the line 16. The pressure-responsive element may, for instance, be a bellows unit, or the like, although for simplicity it comprises a Bourdon tube, having a free end 18 which rises and falls, generally, with fluctuations in pressure in the line 16 and in Bourdon tube 17.

As it is essential that the pressure in conduit 16 and Bourdon tube 17 vary substantially functionally with movements of the valve element 11 in the housing 12, a simple control for this purpose is illustrated in Figs. 1 and 3. Piston or valve element 11 comprises a cylindrical block provided, preferably, in diametrical axial planes, with pistons 9 and 19. Fluid pressure inlet 13 communicates with a chamber 8 disposed between pistons 9 and 19 on the valve element 11.

In mid-position of the valve 11 in housing 12, for instance, the piston 19 closes the outlet port 15. Fluctuations of the valve from this position places instrument pressure outlet port 15 selectively in communication with vent port 14, or inlet port 13. When in communication with exhaust port 14, there is substantially no pressure on the conduit 16 and Bourdon tube 17, which by its inherent resilience moves the end 18 to its downward limit. When in communication with pressure port 15 there is practically no venting, and substantially the entire pressure on port 13 is delivered through conduit 16, overcoming the resilient resistance of the Bourdon tube, and elevating end 18 thereof to the maximum limit for the value of the fluid pressure at port 13.

The elements as so far described comprise the receiver unit of the system, completed by a differential transformer 20, having the axially adjustable armature 21, coupled to and positionable with the free end 18 of the pressure-sensitive unit 17.

The receiver so described comprises means for converting electrical energy, or motion, into fluid-pressure variations, and which in turn convert the instantaneous fluid pressure into electrical signals. While this is an important advance for other reasons, it is pointed out that in general it makes no difference, within reason, how long the conduit 16 may need to be, and this permits the use of fluid pressure conduits in situations where there are fire hazard objections to wire connections.

While any differential transformer organization may be used, having two secondaries and an energizing primary so organized that the voltages induced in the respective secondaries are in bucking relation, it is preferred to use the differential transformer disclosed in Macgeorge patent, No. 2,568,587. With this transformer, in one embodiment, the linearly developing output is a function of a movement of the order of .15" from null, in contrast to the known other previous forms of differential transformers in which the linear developement output is functional with a movement of the order of but .05" from null.

A complemental identical differential transformer 22 is provided in a transmitter, the armature 23 of which is adjustable in the coils of the transformer in response to variations in any variable with which it is associated. It will be understood that the variables to which the armature 23 is responsive may be any variable whatever that can be manifested by a movement, including heat, pressure, rate of flow, liquid level, position of a part of a device, and the like.

The output of differential transformer 22 of the transmitter in Fig. 1 is bucked against the output of the receiver transformer 20 in, illustratively, a series circuit and fed into an amplifier 24, and the latter supplies the motor M, to actuate same in the proper sense when the series circuit is unbalanced, and to stop same when substantial balance is achieved.

In operation, with substantial null balance in the transformer secondaries circuit (which may be with actual null outputs from both transformers, or with nullifying outputs from the circuit of the respective secondaries transformers), the motor M is stationary and both armatures are stationary. With a change of condition of the variable, the armature 23 of transmitter transformer 22 is axially moved to effect an output, or to change an existing output, from the transformer 22. This unbalances the secondaries circuit, and through the amplifier 24 places a motor-running voltage on the motor, the running of the motor M is in the proper sense to change the fluid pressure output from the valve 12 into pressure-responsive device 17, to reposition the receiver armature 21, until the changed output of the transmitter differential transformer is again balanced, when the motor stops.

It will be seen that any desired degree of magnification of operation of the receiver transformer can be effected by the fluid pressure system, in response to small motor movements. It will be understood also that although but one transmitter differential transformer is shown, there may be a plurality of these, each responsive to a different variable, so that unbalance by the transmitter may be a summation of the effects of a plurality of variables. This form of the invention constitutes an electro-pneumatic converter. It will be understood that the variable at the transmitter may initially move a similar valve unit for remotely, by fluid pressure, effecting fluid pressure responsive positioning of armature 23, similar to that which effects positioning of armature 21 of the receiver.

It is a feature of both Figs. 1 and 3 that the conduit or pressure line 16 may have a conduit connection 16', leading to a closed organization (not shown) for usefully utilizing the variable fluid pressure in the conduit 16 and pressure-responsive device 17. The sub-conduit 16' may be used for all sorts of measurements, such, for purely illustrative instance, as a reference pressure for a plurality of manometers or the like. It may lead to a bellows or like closed unit, the motions of the free end of which may perform useful work, as in indicating or recording, or the like.

It will be observed that the servomotor M of Figs. 1 and 3, which for full utilization is a reversible servomotor, may be quite small and be capable of developing very small torque, only sufficient to move the valve element 11, whereas the instrument fluid pressure entering at 13 may be of considerable pressure magnitude to exert a strong force on the instrument 17, so that the signal from the differential transformer 20 is magnified.

While in general the explanation previously given of Fig. 1 pertains equally well to the disclosure of Fig. 3, and they have the same reference characters, Fig. 3 incorporates a refinement not shown in Fig. 1, by which quicker and more accurate response can be made. As shown in Fig. 3 a balancing differential transformer 70 is provided, the armature 71 of which is directly coupled to the piston 11 in valve housing 12, so as to be directly actuated by the motor M. The secondary output leads 72 and 73 of transformer 70 are connected respectively to the wire and movable element of a potentiometer 74, so that the output of the transformer 70 is proportionable to any degree of amplitude of output necessary to effect rebalance of the secondaries circuit of the electrical system. Usually this is only the small difference between the amplitudes of the output voltages of transformers 22 and 20 when unbalanced.

In the form of the invention shown in Fig. 2, forming also parts of the systems shown in Figs. 4 and 5, and having similar reference characters in all three figures for identical parts, a proportional control is effected, in which a small displacement from the motor M effects a proportionally greater displacement with greater force in a proportionally magnified stroke. In these examples the small reversible servomotor M through its connecting rod or the like 10 actuates a movable valve element 11' in a valve housing 12', while a rod 30 coupled to the opposite end of the valve element 11' mounts, or is connected to, the armature 21 of the differential transformer 20. The latter in its secondaries output may incorporate the potentiometer 74 of Fig. 3. As in Fig. 3, there is a direct mechanical linkage between the motor and the differential transformer, but in this case it includes in the linkage line the positionable valve element 11'. One, or a plurality, of variably responsive transmitter differential transformers 22 are provided, the armature 23 of which is positioned in accordance with changes in the instant variable. The receiver and transmitter transformers are in circuit and feed the amplifier 24, the output of which runs the motor M, as is explained above. In this case, however, the valve housing 12' and valve element 11' may have a different organization from that of Fig. 1.

A power cylinder 40 is provided, closed at one end as at 41, and substantially closed at the other end as at 42, except for a gland opening 43 through which a connecting piston rod 44 passes, joined to a piston 45 slidable in the cylinder 40. The piston forms with the end closure 41 a compression chamber 46 having a port 47, and with end closure 42 a compression chamber 48 having a port 50. The piston rod 44 is for coupling to any work, such, for instance, as to a valve to be varied in opening or closing, by the piston rod position. Usually the piston is an agency that affects the condition, variations of which are manifested at the transmitter.

The function of the valve organization of Fig. 2 is to effect a positioning of the piston in the cylinder and therefore the condition of the work proportionally to the setting of the valve element 11' in housing 12'. In an illustrative valve organization for the purpose, the valve element 11' has two enlarged piston heads 51 and 52 spaced by a reduced shank 53, forming a chamber 54. The valve cylinder 12' has end headers 55 and 56 through which the links or connecting rods of the organization pass, and defining with the respective pistons chambers 57 and 58. In the centered position, for instance, of the valve element, piston 51 covers and closes outlet port 60, leading by conduit 61 to the port 47 in compression chamber 46 of the working cylinder, while piston 52 covers outlet port 62 communicating by conduit 63 with compression chamber 48 through port 50. Exhaust port 14' is provided in cylinder 12'. Fluid pressure inlet port 13' is in constant communication with the chambers 57 and 58 respectively by branches 13a, 13a.

With the piston or valve element 11' centered in cylinder 12', both inlet ports 47 and 50 of the working cylinder are locked by the pistons 51 and 52 of valve element 11', as they respectively block ports 60 and 62. This holds the working piston 45 wherever it happens to be in cylinder 40. Let it be assumed that this control point of the fluid pressure valve 11'—12' is consonant with null position of the armature 21 in transformer coils 20. Let it be assumed that then there is unbalance created in the secondaries circuit causing the motor M to run to move the piston 11'. Depending upon the sense of the unbalance, the piston valve element either opens port 60, or 62, to the instrument fluid pressure entering from 13', while coupling the other port of ports 60 and 62 with chamber 54 and thus with exhaust port 14'. Instrument fluid pressure is then effective in one of the compression chambers 46 or 48, while the other compression chamber is placed in communication with an exhaust port 14' and a stroke of the piston 45 ensues, affecting the condition of the work as a proportional function of the unbalance in the electrical secondaries system. As will be appreciated, this organization constitutes a proportional relay, by which a minute or small displacement of a weak force, from the motor M is converted into a proportionally greater displacement of piston 45 with a strong and more powerful force.

It will be seen that the piston 45 and its extension or connecting rod 44 furnishes the illustrative large displacement, which, as noted, is connected to perform useful work, illustratively work affecting one or more of the variables connected to the system in response to valve actuation by servomotor M. It also establishes means by which the return rate of the valve element 11' to substantial center, after a displacement, can be effected and controlled.

Referring to Fig. 4, the main portions of the organization of Fig. 2 are repeated, while an additional differential transformer 80 is provided, the secondaries of which are in aiding circuit relation with the secondaries of the differential transformer 20 bucking the secondaries of transformer 22 in supplying the amplifier 24. In the exemplification of the valve position control of Fig. 4, the armature 81 of differential transformer 80 is connected through a link 82 with the outer free end 83 of a lever 84 having a preferably adjustable pivot 85, to vary the relative lengths of legs of the lever 84, and the other end of which lever is connected pivotally to the connecting rod 44. In this case, the respective differential transformers are preferably substantially identical, having linear outputs similarly functional with small displacements of the armatures, although potentiometer 74 of transformer 20 effects a predetermined reduction in the output of transformer 20. The leverage effected by lever 84 is such as to convert a large displacement of the rod 44 into small displacements of the armature 81 of differential transformer 80. With the system in balance, and illustratively with the motor stopped with the valve element 11' generally centered in the housing 12', a change of variable, at 22, unbalances the secondaries system, placing a motor-running voltage of the proper phase sense upon the motor M. While the running of the motor in response thereto displaces the valve element 11', and, simultaneously produces from transformer 20 a secondaries voltage tending to reduce the unbalance, this is a mere portion of the voltage necessary for the purpose, owing to the reduced secondaries output effected by the potentiometer 74. Meanwhile, the movement of the valve element 11' has produced operating forces on the piston 45 which has moved through an appreciable stroke. As the piston 45 has moved, to a degree usually greater than that of the valve element 11', and, obviously, with greater force, as a proportion of its stroke the secondaries of transformer 80, develop an output additive to the effective output of the secondaries of transformer 20, which overbalances the output from the transformer 22, causing a reversal of the running of the motor M, and a return of the valve element 11' to its generally centered position, while, in so doing, substantially locking the working piston 45 in its attained position. This insures that any further deviation of the condition affecting transformer 22 will find the valve element 11' in a generally centered position, and with the ability to move in either direction by appropriate motor running, according to the sense of the deviation of the condition as manifested at 22.

In the form of invention shown in Fig. 5, all of the parts and circuits shown in Fig. 4 are the same, as are the functions and effects. The only difference is that the response to movement of piston 45 is by a different type of agency than by the proportional movement effected in Fig. 4. In Fig. 5 the piston actuated differential transformer 90 is of a special elongated stroke type shown in Macgeorge Patent 2,568,588, in which the same linearly developed secondaries output is effected by movement of armature 91, but requiring a greatly magnified armature movement to secure same, than that required of transformer 80. This is accomplished by substantially rigidly mounting the armature 91 on a bracket 92 rigidly mounted on the connecting rod 44. As pointed out in said last mentioned Macgeorge patent, with predetermined relations between the other differential transformers and the elongated transformer of said recited patent, a stroke from null output of transformer 90 may be of the order of five inches, to change the output linearly from null to maximum amplitude, with perfect matching of the output of the illustrative other transformers from null in response to a movement of approximately .15 inch of its armature. However, the effective valve element centering control is identical with that of Fig. 4.

Having thus described my invention, I claim:

1. In servomotor apparatus of the class described, a plurality of differential transformers including at least one comprising an effective first transformer, a second and a third differential transformer, each transformer comprising a pair of secondaries in bucking relation, an exciting primary and an armature, the relative position of which latter relative to the secondaries determining the resultant phase and amplitude of the instant secondaries output, an amplifier, means establishing with the secondaries output of all of said transformers a signal input to said amplifier, a reversible servomotor in the output of said amplifier, fluid pressure valve means, means connected to the servomotor and the valve means to establish a train by which the valve means is actuated functionally with servomotor running, a movable element, pressure means for moving said element in response to variations of effective pressure on said pressure means, conduit means between said valve and pressure means, fluid pressure inlet means and venting means leading to said valve means, the armature of said first transformer being arranged for positioning functionally with changes in condition of a variable to develop a signal output from said first differential transformer to place a motor running signal on said motor to position said valve means, means coupling the armature of said second transformer to said train to position same functionally with train movement to develop a signal output from said second transformer toward progressive neutralization of the signal output of said first transformer, and means coupling the armature of said third transformer to said movable element to develop a signal output from the latter additive to that of the second transformer to complete the neutralization of the signal from said first transformer as a feed back signal of position of said movable element.

2. A control system as recited in claim 1, in which the pressure means communicates with a conduit for actuating an associated pneumatic device.

3. A control system as recited in claim 1, the said secondaries of a transformer other than said effective first being connected in said circuit through an adjustable output proportioning means.

4. A control system as recited in claim 1, said secondaries of a transformer other than said first being connected in said circuit through an adjustable output proportioning means, comprising a potentiometer with an adjustable element.

5. A control system as recited in claim 1 in which the pressure means comprises a Bourdon tube.

6. A control system as recited in claim 1, in which the pressure means comprises a cylinder and a working piston in the cylinder and said conduit means comprises both pressure and exhaust conduit means, and in which the valve means in an intermediate position blocks both the pressure and exhaust conduit means from said cylinder in order to hold the working piston in an attained position.

7. A control system as recited in claim 1, in which the pressure means comprises a cylinder and a working piston in the cylinder, and said conduit means comprises both pressure and exhaust conduit means, and in which the valve means in an intermediate position blocks both the pressure and exhaust conduit means, in which following a displacement of the armature of the first effective differential transformer to establish an unbalance in the secondaries circuit, and the running of the servo to actuate the valve means with simultaneous partial neutralization of the signal from the effective first differential transformer, the displacement of the working piston displaces the armature of the said third differential transformer to first balance and then to oppositely unbalance the secondaries circuit, whereby the servo is run oppositely to position said valve means in its said intermediate position to lock the working piston in any attained position thereof in the cylinder as the circuit is reestablished to balance.

8. A control system as recited in claim 1, in which the pressure means comprises a cylinder and a working piston in the cylinder, and said conduit means comprises both pressure and exhaust conduit means, and in which the valve means in an intermediate position blocks both the pressure and exhaust conduit means, in which following a displacement of the armature of the first effective differential transformer to establish an unbalance in the secondaries circuit, and the running of the servo to actuate the valve means with simultaneous partial neutralization of the signal from the effective first differential transformer, the displacement of the working piston displaces the armature of the said third differential transformer to first balance and then to oppositely unbalance the secondaries circuit, whereby the servo is run oppositely to position said valve means in its said intermediate position to lock the working piston in any attained position thereof in the cylinder as the circuit is reestablished to balance, said third differential transformer being similar to the effective first and to the second, and the armature of which is actuated by a pivoted lever pivoted to said working piston to proportion the displacement of its said armature to the stroke of the working piston.

9. A control system as recited in claim 1, in which the pressure means comprises a cylinder and a working piston in the cylinder, and said conduit means comprises both pressure and exhaust conduit means, and in which the valve means in an intermediate position blocks both the pressure and exhaust conduit means, in which following a displacement of the armature of the first effective differential transformer to establish an unbalance in the secondaries circuit, and the running of the servo to actuate the valve means with simultaneous partial neutralization of the signal from the effective first differential transformer, the displacement of the working piston displaces the armature of the said third differential transformer to first balance and then to oppositely unbalance the secondaries circuit, whereby the servo is run oppositely to position said valve means in its said intermediate position to lock the working piston in any attained position thereof in the cylinder as the circuit is reestablished to balance, said third differential transformer being elongated and requiring a longer stroke of its armature for the same change in output of its secondaries as is required of one of the effective first or the second differential transformers with shorter strokes, and means coupling the armature of the said third transformer for direct actuation by said working piston on its stroke.

References Cited in the file of this patent
UNITED STATES PATENTS

| | | |
|---|---|---|
| 2,317,383 | Hull | Apr. 27, 1943 |
| 2,416,097 | Hansen | Feb. 18, 1947 |
| 2,420,539 | Hornfeck | May 13, 1947 |
| 2,451,263 | Webb | Oct. 12, 1948 |
| 2,523,198 | Davies | Sept. 19, 1950 |
| 2,644,124 | Broadbent | June 30, 1953 |